April 15, 1930.　　　F. G. SCHENUIT　　　1,754,836
TIRE
Filed April 23, 1924
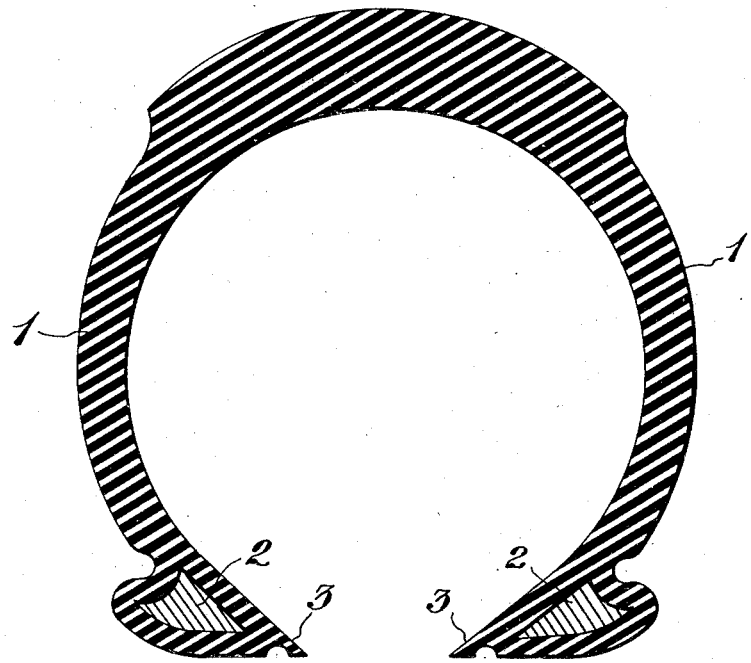
Inventor:
Frank G. Schenuit,
By William W. Varney
attorney Patented Apr. 15, 1930

1,754,836

UNITED STATES PATENT OFFICE

FRANK G. SCHENUIT, OF BALTIMORE, MARYLAND

TIRE

Application filed April 23, 1924. Serial No. 708,337.

My invention relates to automobile tires and has for its object the preventing of pinching and wearing the inner tube by or at the toe of the shoe of the tire.

A further object of my invention is the providing of means of rendering the toe of the securing element of automobile tires flexible with reference to the same.

With the foregoing and other objects in view, my invention consists of the methods employed, combination and arrangements of systems, apparatus and means as hereinafter specifically provided and illustrated in the accompanying drawings wherein is shown the preferred embodiment of my invention, but it is understood that changes, variations and modifications may be resorted to which come within the scope of the claim hereunto appended.

In the drawing of the herein-described embodiment of my invention, I have shown a cross-sectional view of an automobile tire of the clincher type.

1 is the tire. 2 is the securing member, in this case a clincher. 3 is the toe. Ordinarily, the securing member and toe are called "the toe of a tire." I have designated this ordinary toe as a securing member, which is the larger part of the same and which is used to maintain the tire in position, and the smaller, or point edge, as the toe. A groove between securing member 2 and toe 3 is provided; thus weakening the connection between securing member 2 and toe 3 which causes the toe to become very much more flexible with reference to securing member 2 than is ordinarily the case, and this causes the same when in use to become securely pressed against the rim of the wheel and not so susceptible to the working of the tire, the edge of the toe always remaining in contact with the rim thus preventing a wearing of the inner tube at that point.

Having thus described my invention, what I claim and desire to secure by Letters Patent is:

A cushion tire formed of comparatively inextensible material having side walls with a compressible ridge narrower than and extending around the inner periphery of said side walls for engagement with a tire receiving rim.

FRANK G. SCHENUIT.